US010721159B2

(12) United States Patent
Nandy et al.

(10) Patent No.: US 10,721,159 B2
(45) Date of Patent: Jul. 21, 2020

(54) REBUILT FLOW EVENTS

(71) Applicant: Hewlett Packard Enterprise Development LP, Houston, TX (US)

(72) Inventors: Tathagata Nandy, Bangalore (IN); Gopalakrishna Tellapalli, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 140 days.

(21) Appl. No.: 15/961,977

(22) Filed: Apr. 25, 2018

(65) Prior Publication Data

US 2019/0334810 A1 Oct. 31, 2019

(51) Int. Cl.
| H04L 12/703 | (2013.01) |
| H04L 12/18 | (2006.01) |
| H04L 12/931 | (2013.01) |
| H04L 12/24 | (2006.01) |
| H04L 12/717 | (2013.01) |

(52) U.S. Cl.
CPC ............ *H04L 45/28* (2013.01); *H04L 12/185* (2013.01); *H04L 41/0654* (2013.01); *H04L 45/42* (2013.01); *H04L 49/201* (2013.01)

(58) Field of Classification Search
CPC .............................. H04L 45/28; H04L 12/185
See application file for complete search history.

(56) References Cited

U.S. PATENT DOCUMENTS

| 7,362,700 | B2 | 4/2008 | Frick et al. |
| 7,376,078 | B1 * | 5/2008 | Amiocangioli ......... H04L 45/00 370/217 |
| 7,546,380 | B2 * | 6/2009 | Kouvelas ............ H04L 12/1854 709/242 |
| 7,719,958 | B1 * | 5/2010 | Azimi ...................... H04L 12/18 370/220 |
| 7,787,360 | B2 | 8/2010 | Windisch et al. |
| 7,804,769 | B1 * | 9/2010 | Tuplur ................... H04L 45/00 370/218 |
| 8,873,377 | B2 * | 10/2014 | Singatwaria ............. H04J 3/14 370/220 |
| 9,276,756 | B2 | 3/2016 | Dholakia et al. |
| 9,509,522 | B2 * | 11/2016 | Song .................. H04L 12/4641 |
| 9,510,060 | B1 * | 11/2016 | Arya .................. H04N 21/6193 |
| 9,529,670 | B2 * | 12/2016 | O'Connor ........... G06F 11/1076 |

(Continued)

FOREIGN PATENT DOCUMENTS

CN 101895475 11/2010

OTHER PUBLICATIONS

CN101895475B: google machine tranlated docuement.*

(Continued)

*Primary Examiner* — Parth Patel
(74) *Attorney, Agent, or Firm* — Hewlett Packard Enterprise Patent Department (57) ABSTRACT

Examples include receiving a recovery signal and access data stored in a centralized database of a networking device in response to the recovery signal. The data may include information associated to past multicast flow events. Additionally, examples include determining a rebuilt multicast flow event based on the data, generating a multicast protocol packet based on the multicast flow event, and sending the multicast protocol packet to a multicast protocol in the networking device.

19 Claims, 5 Drawing Sheets

(56) References Cited

U.S. PATENT DOCUMENTS

| | | | | |
|---|---|---|---|---|
| 2001/0026556 A1* | 10/2001 | Yagyu | H04L 12/1836 | 370/432 |
| 2003/0046425 A1* | 3/2003 | Lee | H04L 12/1877 | 709/238 |
| 2004/0001485 A1* | 1/2004 | Frick | H04L 41/0663 | 370/389 |
| 2006/0018253 A1* | 1/2006 | Windisch | H04L 45/00 | 370/216 |
| 2006/0034203 A1* | 2/2006 | Kozu | H04W 76/19 | 370/312 |
| 2007/0011350 A1* | 1/2007 | Lu | H04L 12/185 | 709/238 |
| 2007/0183313 A1* | 8/2007 | Narayanan | H04L 49/357 | 370/216 |
| 2008/0108376 A1* | 5/2008 | Chen | H04H 40/18 | 455/466 |
| 2009/0086623 A1* | 4/2009 | Gao | H04L 41/0654 | 370/221 |
| 2009/0147784 A1* | 6/2009 | Miyazawa | H04L 12/40 | 370/390 |
| 2009/0187941 A1* | 7/2009 | Smith | H04L 12/1854 | 725/35 |
| 2009/0264127 A1* | 10/2009 | Chun | H04W 1/1607 | 455/435.2 |
| 2009/0319664 A1* | 12/2009 | Tajima | H04L 45/125 | 709/226 |
| 2010/0284269 A1* | 11/2010 | Zhu | G06F 11/0757 | 370/221 |
| 2011/0228770 A1* | 9/2011 | Dholakia | H04L 45/586 | 370/390 |
| 2012/0084432 A1* | 4/2012 | Soprovich | H04L 41/069 | 709/224 |
| 2012/0135768 A1* | 5/2012 | Li | H04W 76/30 | 455/509 |
| 2012/0294308 A1* | 11/2012 | Cai | H04L 45/38 | 370/390 |
| 2012/0329527 A1* | 12/2012 | Kang | H04N 13/349 | 455/566 |
| 2013/0297757 A1* | 11/2013 | Han | H04L 41/0806 | 709/222 |
| 2014/0133354 A1* | 5/2014 | Scharf | H04L 45/42 | 370/254 |
| 2014/0133388 A1* | 5/2014 | Wager | H04B 7/14 | 370/315 |
| 2014/0226464 A1* | 8/2014 | Kumar | H04L 45/28 | 370/225 |
| 2014/0254591 A1* | 9/2014 | Mahadevan | H04L 45/16 | 370/390 |
| 2015/0263847 A1* | 9/2015 | Baillargeon | H04L 7/0008 | 370/216 |
| 2015/0312140 A1* | 10/2015 | Yang | H04L 12/1863 | 370/218 |
| 2016/0036625 A1* | 2/2016 | Hu | H04L 43/0811 | 370/228 |
| 2016/0043878 A1* | 2/2016 | Hao | H04L 45/16 | 370/390 |
| 2016/0162000 A1* | 6/2016 | Fujiwara | H02J 13/00 | 713/340 |
| 2017/0034047 A1* | 2/2017 | Bhattacharya | H04L 12/4641 | |
| 2018/0191870 A1* | 7/2018 | Ramesh | H04L 12/1881 | |
| 2018/0367451 A1* | 12/2018 | Gulrajani | H04L 45/54 | |
| 2019/0150217 A1* | 5/2019 | Kim | H04W 76/19 | 370/329 |
| 2019/0334810 A1* | 10/2019 | Nandy | H04L 41/0654 | |

OTHER PUBLICATIONS

Configuring PIM Sparse Mode Graceful Restart, (Research Paper), Feb. 2, 2017, 1 Pg.

Understanding Nonstop Active Routing for PIM, (Research Paper), Aug. 21, 2004, 1 Pg.

* cited by examiner

REBUILT FLOW EVENTS

BACKGROUND

Networking devices (e.g., switches, routers, etc.) may handle different types of data packets, including unicast data packets and multicast data packets. A multicast data packet may use an internet protocol (IP) address as a proxy for a group of devices (e.g., a multicast group IP address). This multicast group IP address may not correspond to a device (e.g., physical device, virtual machine, etc.) on the network. Instead, actual devices in the network subscribe to the multicast group IP address and the data packets sent to the multicast group I addresses are routed to the actual devices using the networking devices. Accordingly, networking devices may use multicast specific processes to handle and route the multicast data packets.

BRIEF DESCRIPTION OF THE DRAWINGS

The following detailed description references the drawings, wherein.

DETAILED DESCRIPTION

In some examples, a multicast protocol (e.g., implemented by instructions stored on a non-transitory machine-readable storage medium executable by a processing resource, etc.) may determine the routing of multicast data packets received by a networking device. For example, a network may comprise a number of networking devices. Some of the networking devices may be connected to an endpoint (e.g., a host device, a user computing device, a controller, etc.). Other networking devices may be intermediate networking devices (e.g., core switches, aggregator switches, etc.) that connect the networking devices connected to the endpoints. The intermediate networking devices may use the multicast protocol to route (i.e. forward) multicast data packets from one intermediate device to another intermediate device (to ensure that the data is received by all members of a multicast group).

Thus, a multicast protocol running on a networking device may determine which port of the networking device may be used to forward a multicast data packet through such that the data packet is sent to an accurate next hop networking device on its path to a member device in a multicast group IP. The multicast protocol may determine this information based on an understanding of its neighbors (i.e., connected networking devices that also implement the same multicast protocol), what multicast group path the networking device is a "hop" in, etc.

The multicast protocol may interact with other components of the networking device to "transfer" its determinations. For example, the networking device may have hardware components (e.g., Application Specific Integrated Circuit (ASIC), etc.) that handles the forwarding of the data packets based on directions set by the multicast protocol. The first time a specific type of data packet is received by the networking device, the hardware component may look to see whether the multicast protocol has previously give directions on this specific type of data packet. Based on directions being present (e.g., in a table, etc.), the hardware component may independently (e.g., without the involvement of the multicast protocol) forward the data packet according to the directions. However, if the hardware component does not have directions for the specific type of data packet, the data packet is missed and the routing of that type of data packet is then determined by the multicast protocol. The multicast protocol may determine the flow of the packet within the networking device and transfer this determination to the other components of the networking devices.

In some examples, the transfer of this determination may be handled through the interaction of the protocol and the other components with a centralized database (e.g., Open vSwitch Database, etc.). The multicast protocol may update the centralized database with information related to its determination and other components may access the centralized database and use this information to receive the determination. For example, a component may access the database to program the ASIC accordingly.

The multicast protocol may also update its own knowledge of the state of the other components. For example, once the protocol determines a path for a specific type of data packet, it updates an internal memory accessible only to the protocol accordingly. This allows the protocol to be in sync with other components of the networking device.

In some examples, a networking device may include at least two components that handle the same responsibilities. During normal operations, one of the two components may handle all of the load. However, having duplicate components allows for one component to take over when the other fails. For example, the networking device may include two components that implement the multicast protocol. In some examples, these two components may be distinct and separate from each other such that a failure of one does not affect the operation of the other. For example, each component may have its own processing resource and its own non-transitory machine-readable storage-medium encoded with the instructions of the multicast protocol. In other words, in some examples, the instructions for the execution of the protocol may be the same for the two components but the processing resource and storage medium may be different.

One multicast protocol may be active (process the multicast data packets) while the other protocol may be in standby. The active protocol may update its internal information of the states of the networking device. However, the standby protocol does not update its internal information. Accordingly, when the standby protocol becomes active (e.g., in response to the failure of the other protocol, etc.), the standby protocol does not have knowledge possessed by the protocol that was active. For example, it does not know the multicast neighbors. Thus, it may not process the new data flows. Additionally, the protocol is not in sync with other components of the networking device. For example, the ASIC may be programmed in a certain way but the protocol does know that it is programmed in that certain way.

In some examples, to ensure that its own state is in sync, the now-active protocol may erase the entries in the centralized database and process the flows as new flows (e.g., not handled by the failed protocol), even if some types of flowers were previously processed by the failed protocol. The other components of the networking device and the outside environment may be affected by this deletion in the centralized database. For example, components in the networking device that program the ASICs may delete the information in the ASIC because of the deletions in the centralized database. This causes traffic disruption. Additionally, the now-active protocol needs to re-learn all previously learnt paths. Correspondingly, the ASICs need to be reprogrammed. This causes unnecessary waste of processing power and time delays. This also causes unnecessary traffic losses with some protocols because flow misses are needed for the protocol to process the flow.

Examples disclosed herein address these technological issues by providing a method for a multicast protocol to regenerate or update its knowledge of the networking device states. In some examples, the method provides for the access of the centralized database to read information related to multicast flow events. From this information (e.g., neighbor information, multicast IP address information, etc.), a rebuilt multicast flow event may be determined. At least one multicast protocol packet is generated based on the rebuilt multicast flow event. The multicast protocol packet is sent to the multicast protocol, which may regenerate its knowledge through the multicast protocol packet. Thus, examples discussed herein allow for reduced traffic loss upon unplanned failover or planned switchover of a multicast protocol. Additionally, examples disclosed herein may also be used to reduce traffic loss upon planned or unplanned restart of a multicast protocol. Because the flow events are not propagated to a protocol that is in standby mode, instructions (i.e. code) for both the active protocol and the standby protocol may be similar.

In some examples, a computing device is provided with a non-transitory machine-readable storage medium. The non-transitory machine-readable storage medium includes instructions, that when executed, cause a processing resource to receive a recovery signal. The storage medium also includes instructions, that when executed, cause the processing resource to access data stored in a centralized database of the networking device. The data may comprise information associated to past multicast flow events. The storage medium additionally includes instructions, that when executed, cause the processing resource to determine a rebuilt multicast flow event based on the data, generate a multicast protocol packet based on the multicast flow event, and send the multicast protocol packet to a multicast protocol in the networking device.

In some examples, a network device comprises a memory, a first protocol engine, and a recovery engine. The memory is to store information associated to multicast flow events in the networking device. The recovery engine is to receive a recovery signal, access the information in response to the recovery signal, determine a rebuilt multicast flow event based on the information, generate a multicast protocol packet based on the rebuilt multicast flow event, and send the multicast protocol packet to the first protocol engine. The first protocol engine is to regenerate a state of the networking device based on the multicast protocol packet.

In some examples, a method comprises receiving a recovery signal, accessing in centralized database of a networking device, information associated to past multicast flow events of the networking device. The access of the database is in response to the recovery signal. The method includes rebuilding an estimated multicast flow event based on the information, generating a Protocol Independent Multicast (PIM) packet based on the estimated multicast flow event, and sending the PIM packet to a PIM protocol in the networking device.

Figure 1:
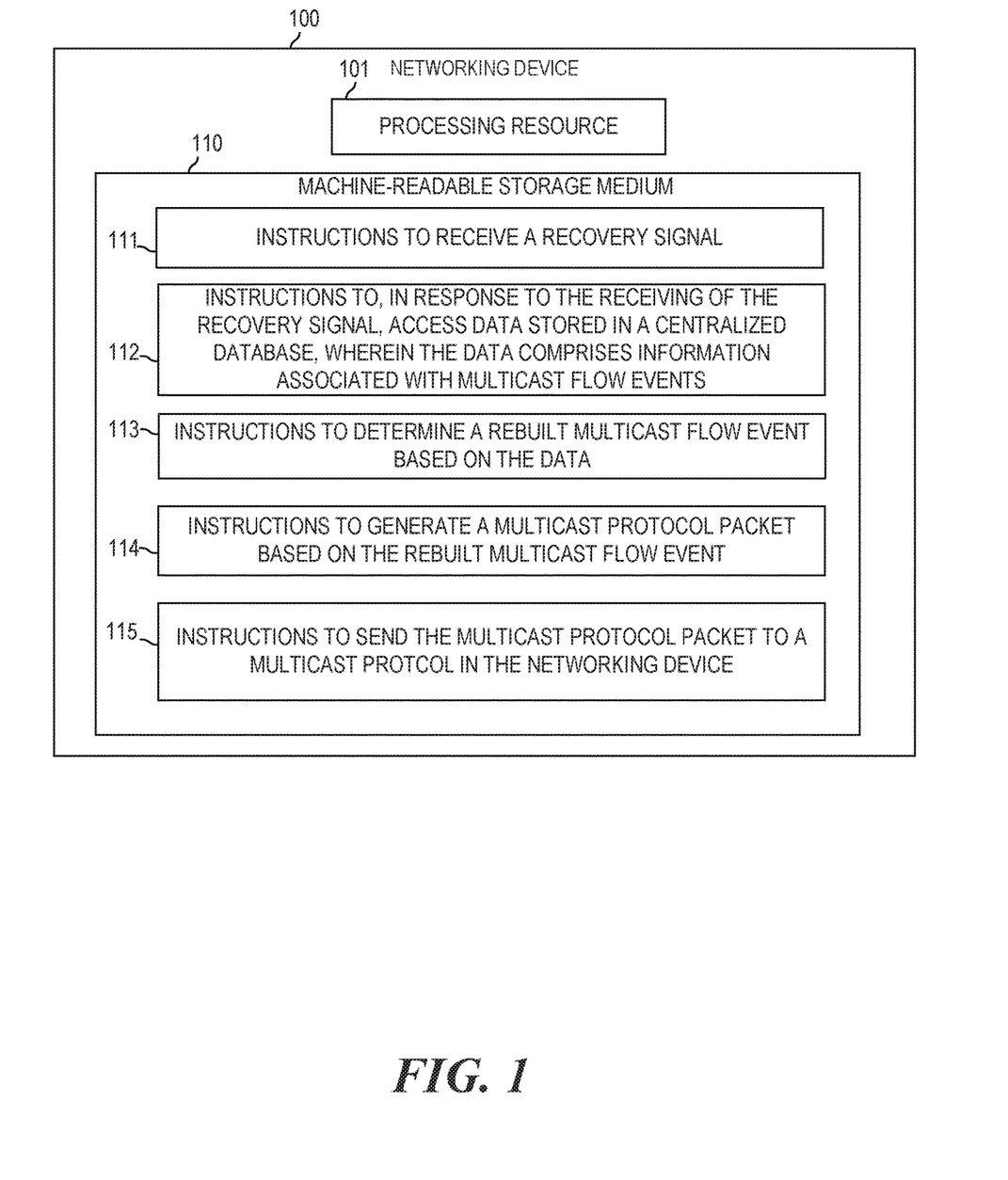
FIG. 1 is a block diagram of a networking device to rebuild a multicast flow event and generate a packet from the rebuilt multicast flow event, according to some examples.

Referring now to the figures, FIG. 1 is a block diagram of a networking device 100 to rebuild a multicast flow event and generate a packet from the rebuilt event. As used herein, a networking device may be a device used in a network for the transmission of packets to the network (e.g. from an outside network), from the network (e.g. to an outside network), and/or within the network (from one device in the network to another device in the network). Non-limiting examples of a networking device include a router, switch, etc. Networking device 100 may be connected to other computing devices in the network. As used herein, a "computing device" may include a server, a networking device, a chipset, a desktop computer, a workstation, a mobile phone, a tablet, an electronic reader, or any other processing device or equipment.

Networking device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, 114, 115, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 111, 112, 113, 114, and 115 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to networking device 200 in FIG. 2 or switch 300 in FIG. 3. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, and 115 as described herein.

Instructions 111 may be executable by processing resource 101 to receive a recovery signal. The signal may be sent from a computing device (e.g., management server)

connected to the networking device 100. Additionally, the signal may be sent from a component internal to networking device 100. As used herein, a recovery signal indicates to the networking device 100 that a component of the networking device that determines packet flow in the networking device should update its knowledge of the states of the networking device.

For example, a network device may be conceptually divided into a control plane and a data plane. The data plane may comprise hardware components such as an Application Integrated Specific Circuit (ASIC) that is programmed to forward data packets received by the networking device using tables. The content of these tables may be determined by components grouped in the control plane. Thus, based upon a determination by the control plane that a certain type of data packet should take a certain path, the ASIC may be programmed accordingly, and future data packets received by the networking device that are of the same type may be handled (e.g., routed) by the data plane using the same path. This allows components in the control plane to focus on other processing matters.

Accordingly, components in the control plane may be characterized as a component that determines packet flow in the networking device. These components may be implemented by a combination of hardware (e.g., a processor such as an integrated circuit or other circuitry) and software (e.g., machine or processor-executable instructions, commands, or code such as firmware, programming, or object code) of the networking device 100 to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. In some examples, the components that determine packet flow may be separated from instructions 111-115 such that a failure of those components does not affect the function of instructions 111-115.

Other conceptual divisions may be used, in addition to the control plane and the data plane. For example, networking device 100 may also include a management plane (e.g., for use with command-line interface (CLI) commands, configurations, graphical user interface, etc.).

"A state", as used herein, includes a condition of the networking device, conditions of components of the networking device (e.g., different software processes executable by a processing resource, hardware components, etc.), and/or conditions in the environment that may affect the networking device. For example, the control plane may keep track of the routes that are programmed into the ASIC via an update of a table each time the ASIC is programmed as a way of keeping up to date with the state of the ASIC, This allows the control plane to understand what is occurring in the networking device and what types of flows have been programmed and what types of flows have not been programmed.

In some examples, networking device 100 may be a multicast networking device that may handle multicast data flow. Accordingly, networking device 100 may implement multicast protocols to determine the routing of multicast packets. These protocols may be characterized as a component in the control plane, as discussed above. Accordingly, a multicast protocol may be implemented by a combination of hardware and software. Non-limiting examples of multicast protocol includes Protocol Independent Multicast (PIM).

Thus, a recovery signal may include an indication that a multicast protocol has crashed and no longer has the knowledge and must rebuild that knowledge.

In some examples, the control plane may be designed such that the multicast function has high availability. This allows the continuing functioning of multicasting even though the multicast protocol becomes inactive. Thus, networking device 100 may have two components in the control plane that implement the same multicast protocol. One may be active while the other is in standby. In response to one protocol becoming inactive, the other one may switch from being in standby to being active.

Accordingly, the recovery signal received by instructions 111 may also include an indication that a previously active multicast protocol has failed and a previously inactive protocol has now taken over.

Based on the receiving of the recovery signal, instructions 112 are executable by processing resource 101 such that networking device 100 accesses data stored in a centralized database on networking device 100. As used herein, a centralized database may include a memory. In some examples, a centralized database may be accessible (e.g., read and/or write) to all the components of networking device 100 as a place for the components to log activities of the components. Accordingly, a component of networking device 100 may write to the centralized database and other components may read the centralized database to understand the state of that component. In some examples, the components may follow a subscribe/publish model to the OVSDB. Thus, a component may subscribe to changes that another component published to the OVSDB, Additionally, in some examples, the centralized database may be read-accessible, read-write accessible, or write-accessible to computing devices external to networking device 100. One non-limiting example of a centralized database as used herein is an Open vSwitch Database (OVSDB).

The centralized database may store information related to different components in the networking device 100, including information associated with multicast flow events handled by the multicast protocol. The different information may be stored in different tables in the database. Flow events may include events that involve the internal routing and processing of packets by networking device 100, including but not limited to the handling of Hello Packets, Join packets, multicast data packets, etc.

For example, networking device 100 may receive a PIM IPv4 Hello Packet from a neighbor networking device. The Hello Packet may include a neighbor IP address, the port of networking device 100 that received the Hello Packet, the address family, priority, hold time, etc. The packet may be handled by the PIM module. The PIM component may write the information gained from the Hello Packet into a PIM_Neighbor table in the OVSDB. This information may be accessible by a CLI show command via a configuration plane of networking device 100. This information is also accessible by a hardware programming component that may program the ASIC based on this information. Other non-limiting examples of information stored may include information regarding addresses for multicast groups (e.g., in an Mroute table), next hop information, etc.

In some examples, the data accessed is for flow events that have occurred (past events). An event that is past or has occurred may be after the receiving of the recovery signal. This is because, in some examples, the multicast protocol does not process any packets when its states is updated. Therefore, in these examples, the multicast protocol does not perform any reads or writes from the OVSDB. An event that occurs after the receiving of the recovery signal may be queued for processing by the multicast protocol at a later time.

Instructions 113 may be executable by processing resource 101 to determine a rebuilt multicast flow event based on the data. Accordingly, processing resource 101 due to instructions 113 may read the data in the OVSDB and "reverse engineer" a rebuilt flow event. In some examples, the reversed engineered event (rebuilt) event may be exactly the same event that caused the write into the OVSDB.

Instructions 114 may be executable by processing resource 101 to generate a multicast protocol packet based on the rebuilt flow event. The protocol of the packet generated is the same protocol that is used by the multicast protocol such that the multicast protocol is able to process the multicast packet generated.

For example, data in the centralized database may include data regarding neighbors of the networking device that also use PIM. This data may be stored in a PIM_Neighbor table, as shown below in Table 1.

TABLE 1

| Neighbor IP | Neighbor Port | Address Family | Dr Priority | Hold Time |
|---|---|---|---|---|
| 10.10.1.2 | 1/1/1 | IPV4 | 10 | 90 |
| 40.40.1.2 | 1/1/3 | IPV4 | 10 | 90 |
| 50.50.1.2 | 1/1/4 | IPV4 | 10 | 90 |

Based on the first entry from Table 1, instructions 113 may be executable by processing resource 101 to determine that the event that generated this entry was the receiving of a Hello Packet from P address 10.10.1.2 at port 1/1/1 of networking device 100. Instructions 114 may be executable by processing resource 101 to generate a corresponding PIM Hello Packet. The PIM Hello packet may be an IPv4 and comprise 10.10.1.2 as the source IP and indicate neighbor port 1/1/1 on networking device 100. It may also comprise additional information seen in table 1, such as the priority and hold time.

Many factors may be used in determining the rebuilt flow event. For example, the data type may help guide the determination of the rebuilt flow event. Information read from a PIM_Neighbor table, for example, may indicate that the rebuilt event is a Hello Packet, while information read from an MRoute table, may indicate that the rebuilt event is a multicast data packet and not a Hello Packet.

Additionally, the information in the data itself may be used to determine rebuilt flow events. For example, data in the table may include information regarding multicast addresses (stored in a table called an Mroute) and information regarding the next networking device in the chain (stored in a table called NextHop). The Mroute table is shown in Table 2 and the NextHop table is shown in Table 3, below.

TABLE 2

| Input Port | Source Address | Group Address | Pointer To Next Hop | Address Family |
|---|---|---|---|---|
| 1/1/1 | 20.20.20.1 | 224.1.1.1 | 1, 2 | IPv4 |

TABLE 3

| SL no | Next Hop Interface | Is_pruned |
|---|---|---|
| 1 | 1/1/3 | False |
| 2 | 1/1/4 | False |

Based on the single entry in Table 2, networking device 100 (due to instructions 113) may determine that a rebuilt flow event is the receiving of a multicast data packet on port 1/1/1 of networking device 100 from source IP 20.20.20.1 for multicast group address 224.1.1.1 Networking device 100 (due to instructions 114) may generate a multicast data packet indicating at its source IP 20.20.20.1 for port 1/1/1 and intended for multicast group 224.1.1.1.

Based on the first entry in Table 3 and the single entry in Table 2, networking device 100 (instructions 113) may determine that a rebuilt event is the receiving of a Join packet by port 1/1/3 on networking device with the multicast group address 224.1.1.1. Based on the second entry in Table 3 and the single entry in Table 2, networking 100 (instructions 113) may determine that a rebuilt event is the receiving of a Join packet by port 1/1/4 on networking device with the multicast group address 224.1.1.1. This is because the "Pointer" field in Table 2 indicates that the next hop is 1, 2. Table 3 has SL number of 1, and 2, which correlates the ports associated with SL number. For example, in situations where the single entry in Table 2 does not have a next hop entry, (e.g., a NULL), networking device 100 (instructions 113) may determine that the rebuilt event is the receiving of a multicast data packet and no Join packets. Networking device 100 (due to instructions 114) may generate packets accordingly.

Instructions 115 may be executable by processing resource 101 to send the multicast protocol packet to the multicast protocol in networking device 100. As discussed above, the multicast protocol may be implemented in networking device 100 by a set of instructions that are executable by processing resource 101 or another processing resource in networking device 100 that is not shown. In some examples, the multicast protocol may be considered an engine, as described herein. In some examples, networking device 100 may include two components (engines) that run the same multicast protocol. One protocol may have recently experienced an error state (that may have generated the recovery signal) and the other protocol may be taking over for the protocol in error state. In these examples, the packet may be sent to the protocol that is taking over for the one that recently experienced an error state. In some examples, and as shown in FIG. 1, instructions 111-115 may be a set of instructions that interfaces with the multicast protocol in networking device 100 (e.g., as a different thread than the multicast protocol).

In some examples, and not shown in FIG. 1, machine readable storage medium 110 may include instructions to start a timer in response to the recovery signal, instructions to stop receive a signal from the multicast protocol that a state regeneration is completed, and instructions to stop the timer in response to the stop signal. This may allow an administrator to determine how long the state regeneration process takes.

Figure 2:
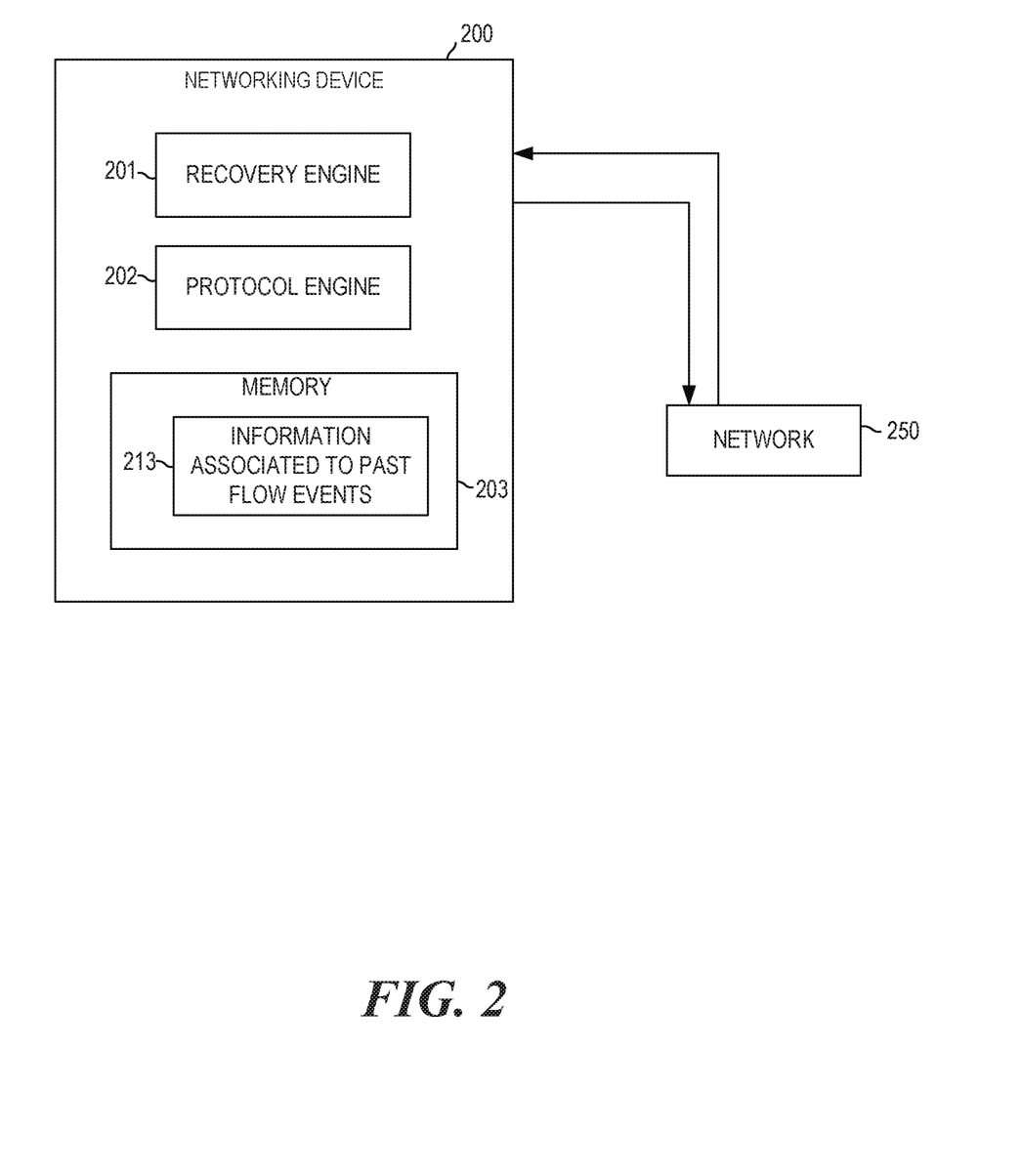
FIG. 2 is a block diagram of a networking device to regenerate a states of the networking device based on rebuilt multicast flow events, according to some examples.
Figure 3:
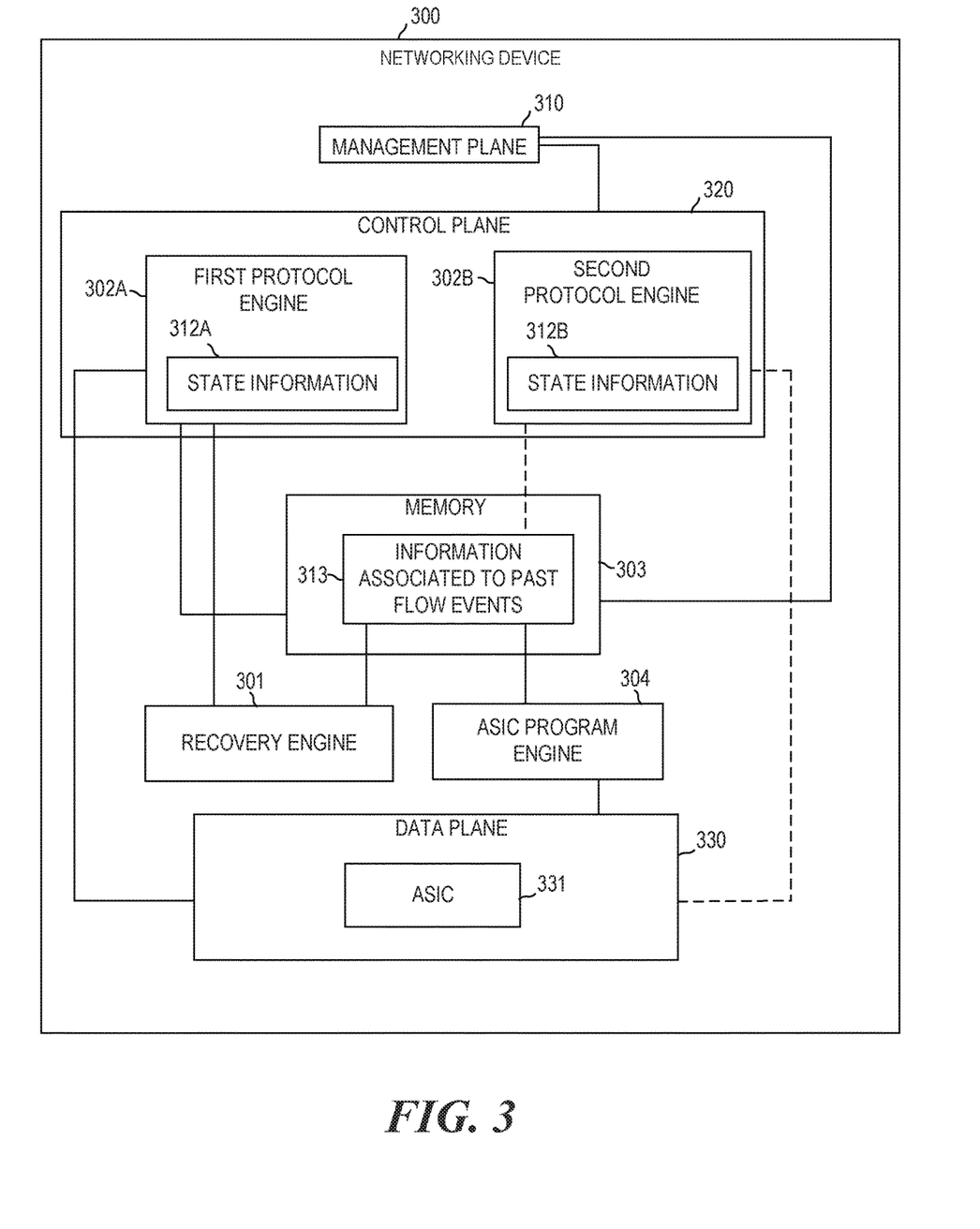
FIG. 3 is a block diagram of a networking device with an inactive protocol engine and an active protocol engine in its control plane, according to some examples.

Networking device 100 of FIG. 1, which is described in terms of processors and machine-readable storage mediums, can include one or more structural or functional aspects of networking device 200 of FIG. 2, or switch 300 of FIG. 3, which are described in terms of engines containing hardware and software.

FIG. 2 is a block diagram of a networking device 200 to regenerate a state of the networking device based on rebuilt multicast flow events. Networking device 200 comprises recovery engine 201 and protocol engine 202. Other engines may be added to networking device 200 for additional or alternative functionality. Engines 201 and 202 may interface with memory 203. Memory 203 may be implemented by a machine-readable storage medium, as described above. Memory 203 may store information associated with past flow events 213. Flow events, as described above, is also applicable here. In some examples, the information may be stored in a centralized database such as an OVSDB.

Networking device 200 may be connected to network 250. Network 250 may comprise other computing devices, including networking devices 200 similar to networking device 200.

Each of engines 201, 202, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise, Thus, for example, the term "engine" is intended to mean at least one engine or a combination of engines.

Each engine of networking 200 can include at least one machine-readable storage mediums (for example, more than one) and at least one computer processor (for example, more than one). For example, software that provides the functionality of engines on networking device can be stored on a memory of the networking device 200 to be executed by a processor of the networking device 200.

Recovery engine 201 engine thus includes a combination of hardware and software that allows networking device 200 to receive a recovery signal. Recovery signal, as described above in relation to instructions 111, is applicable here. In some examples, the recovery signal may originate from the networking device 200. For example, protocol engine 202 may encounter an error in its process and restart. Upon restart, protocol engine 202 may send the signal to recovery engine 201 to indicate that protocol engine 202 needs to update its knowledge of the states of networking device 200. In other examples, the recovery signal may originate from the external environment of networking device 200. For example, an administrator may indicate that protocol engine 202 of networking device 200 needs to update its knowledge of the state and issue a command via a management plane that is connected to networking device 200. This may occur after the installation of a software update.

In response to the receiving of the recovery signal, recovery engine 201 accesses memory 203. Specifically, recovery engine accesses information 213 of memory 203. This information may be organized in memory 203 in the form of tables that are related to different aspects of multicast flow. For example, information related to multicast neighbors may be stored in a table designated for that (e.g. a PIM_Neighbor table). As another example, information related to multicast addresses may be stored in a designated table (e.g., an MRoute table). Recovery engine 201 has knowledge of the types of information that is associated to multicast flow events and accesses the memory location where that information is stored.

Recovery engine 201 may determine a rebuilt multicast flow event based on the information it reads. As described above in relation to instructions 113, the determination may be based on the type of information that it is reading, including the location of the information in the database, and the content of that information. For example, based on an Mroute table, recovery engine 201 may determine whether or not a rebuilt multicast flow event includes a Join packet received by networking device 200.

Additionally, recovery engine 201 may generate a multicast protocol packet based on the rebuilt multicast flow event and send the multicast protocol packet to protocol engine 202. The discussion above in relation to instructions 114 and 115 are also applicable here.

Protocol engine 202 includes a combination of hardware and software. Protocol engine 202 may implement a multicast flow protocol, such as PIM, Accordingly, protocol engine 202 may allow networking device 200 to process and route multicast flow packets received by networking device 200. During its processing of multicast flow packets, it may understand the multicast environment of networking device 200 (e.g., neighbor devices), determine routing paths that should be programmed into a hardware component of networking device 200, etc. Protocol engine 202 may keep records of the state of other components of networking device. For example, once it directs the programming of a certain path in a hardware component of networking device 200, protocol engine 202 keeps a record (e.g., stored in a table) of this path so that it understands that networking device 200 may handle a similar type of flow. Accordingly, protocol engine 202 may comprise a memory that may store this information (not shown in FIG. 2). This memory may be separate from memory 203 as this memory may be accessible to protocol engine 202 and is not a centralized memory, like memory 203.

As discussed above, protocol engine 202 may process multicast flow packets received by networking device 200. While doing this, protocol engine 202 may encounter an error, requiring it to restart its processes. After restarting, protocol engine 202 may lose all the information that it previously had on the state of the different components involved in the multicast protocol. However, due to recovery engine 201, protocol engine 202 may rebuild its knowledge of the states without missing already learned paths.

This is because recovery engine 201 sends at least one multicast protocol packet based on the rebuilt flow events that it determines. Since memory 203 stores information for past flow events, including events that protocol engine 202 encountered before its restart, the protocol packets sent by recovery engine 201 covers the already learned events encountered by protocol engine 202.

For example, protocol engine 202 may receive a Hello Packet from recovery engine 201 and rebuild its data like it normally would as it if were processing a "live" Hello Packet that is sent to networking device via network 250. This allows protocol engine 202 to rebuild its state data without direct interaction with the information 213 stored in memory 203 (e.g., the OVSDB). For example, protocol engine 202 does not need to erase the multicast information in OVSDB and start over. Because the OVSDB is not changed (in relation to multicast protocol information), interactions with networking device 200 via the OVSDB are not interrupted due to changes in the OVSDB. Additionally, the processes of internal components of the networking device 200 are not interrupted due to the changes in the OVSDB. For example, paths that are already programmed into the ASIC are not erased.

During the regeneration of its state, protocol engine 202 may not process any new multicast flow events received by networking device 200 and may queue them for later processing. For example, the processing of new multicast flow events may be done upon completion of the regeneration of the protocol engine state. Accordingly, recovery engine 201 may also send a signal to protocol engine 202 that tells protocol engine 202 when it completes its transmission of multicast protocol packets so that protocol engine 202 understands that it may begin to process queued multicast flow events.

As discussed above, in some examples, recovery engine 201 may start a timer in response to receiving the recovery signal. Protocol engine 202 may send a signal to recovery engine 201 upon its completion of the processing of the multicast protocol packets it receives from recovery engine 201. In response to this stop signal, recovery engine 201 may stop the timer.

In some examples, protocol engine 202 may be an engine that interacts with recovery engine 201.

Networking device 200 of FIG. 2, which is described in terms of engines containing hardware and software, can include one or more structural or functional aspects of networking device 100 of FIG. 1, or switch 300 of FIG. 3.

FIG. 3 is a block diagram of a switch 300. Switch 300 conceptually comprises a management plane 310, a control plane 320, and a data plane 330. Switch 300 may be connected to a network (now shown in FIG. 3). Management plane 310 may be used by an administrator of the network to manage switch 300 including setting configurations using a command-line interface (CLI), a graphical user interface (GUI), etc.

Control plane 320 comprises components that are used for the determination of packet flows through switch 300. Control plane 320 may comprise first protocol engine 302A and second protocol engine 302B. First protocol engine 302A and second protocol engine 302B implement the same multicast protocol. For example, first protocol engine 302A and second protocol engine 302B may both implement the PIM protocol. Similar to protocol engine 202 of FIG. 2, first protocol engine 302A and second protocol engine 302B both keep information regarding the state of multicast components in networking device in non-transitory storage mediums that are accessible to the relative protocol engines. First protocol engine 302A comprises state information 312A and second protocol engine 302B comprises state information 312B.

Data plane 330 comprises hardware components such as Application Specific Integrated Circuit (ASIC) 331. These components may forward data packets received by switch 300 according to paths determined by control plane 320 (specifically first protocol engine 302A and second protocol engine 302B).

Switch 300 additionally comprises recovery engine 301, memory 303 comprising information 313, and ASIC program engine 304.

Recovery engine 301 is similar to recovery engine 201, except that it communicates to both first protocol engine 302A and second protocol engine 302B. ASIC program engine 304 is a combination of hardware and software. ASIC program engine 304 may program the components of the data plane 330. For example, ASIC program engine 304 may generate forwarding tables used by ASIC 331 in determining where to forward data packets.

The first time switch 300 receives a data packet for which the ASIC 331 does not understand where to forward the packet, the path may be determined by the control plane 320. Generally, either first protocol engine 302A is active or second protocol engine 302B is active. The other protocol engine is in standby. For example, in FIG. 3, assuming that second protocol engine 302B is the active engine, second protocol engine 302B may process data packets received by switch 300 and determine where to route the packet to. Second protocol engine 302B accesses memory 303 (specifically, information associated to past flow events 313) and updates a relevant portion of the memory. As discussed above, this information may be stored in an OVSDB. For example, the packet received may be a multicast data packet with a specific multicast group IP address. Second protocol engine 302B may determine that the next hop (next networking device) is connected to a specific port of switch 300. Second protocol engine 302B may update the OVSDB (e.g., in an Mroute table) accordingly. Second protocol engine 302B may also update its state information 312B accordingly.

ASIC program engine 304 may subscribe to this change in the OVSDB and rely on this information to program an egress interface of the ASIC 331. Other information may also be relevant for the ASIC program engine 304 to program an egress interface. This information may be characterized as multicast routing information. Likewise, an administrator may also use a CLI show command to access the OVSDB and see what the multicast routing information is. Accordingly, the OVSDB may be used as a centralized information source that coordinates the states of different components of switch 300.

In some situations, second protocol engine 302B may encounter an error in its process and may fail. Upon failure of second protocol engine 302B, second protocol engine 302B no longer interacts with memory 303 and data plane 330. This is represented by the dotted lines in FIG. 3. First protocol engine 302A may have knowledge of the failure of second protocol engine 302B and take over for second protocol engine 302B. First protocol engine 302A then interacts with data plane 330 and memory 303. While it was in standby mode, first protocol engine 302A was not aware of the flow events processed by second protocol engine 302B (i.e. flow events are not propagated to first protocol engine 302A). Accordingly, state information 312A may be not in sync with the events processed by second protocol engine 302B. For example, first protocol engine 302A may not know that ASIC 331 is programmed with a certain path. Additionally, first protocol engine 302A may not know the identities of multicast neighbors, etc.

When second protocol engine 302B fails, recovery engine 301 may receive a recovery signal from first protocol engine 302k The recovery signal may indicate that first protocol engine 302 needs to update its state information 312A. The regeneration of the state information 312A may proceed as described in relation to recovery engine 201 and protocol engine 202, in FIG. 2.

This allows first protocol engine 302A to sync its state data without direct manipulation of information 313 stored in memory 303 (e.g., the OVSDB). For example, protocol engine 302A does not need to erase the multicast information in OVSDB and start over. Because the OVSDB is not changed (in relation to multicast protocol information), external interactions with 300 via the OVSDB are not interrupted due to changes in the OVSDB. For example, information entered by the second protocol engine 302B may still be accessed by the management plane. Additionally, the processes of internal components of the networking device 300 are not interrupted due to the changes in the OVSDB. For example, paths that are already programmed into the ASIC are not erased. Thus, the forwarding of data on the data plane is not interrupted when a failover in the control plane occurs. Accordingly, switch 300 does not miss data flows that were already processed by second protocol engine 302B and the "work" performed by second protocol engine 302B before its failure is not lost.

Switch 300, which is described in terms of engines containing hardware and software, can include one or more structural or functional aspects of networking device 100 of FIG. 1 or networking device 200 of FIG. 2.

Figure 4:
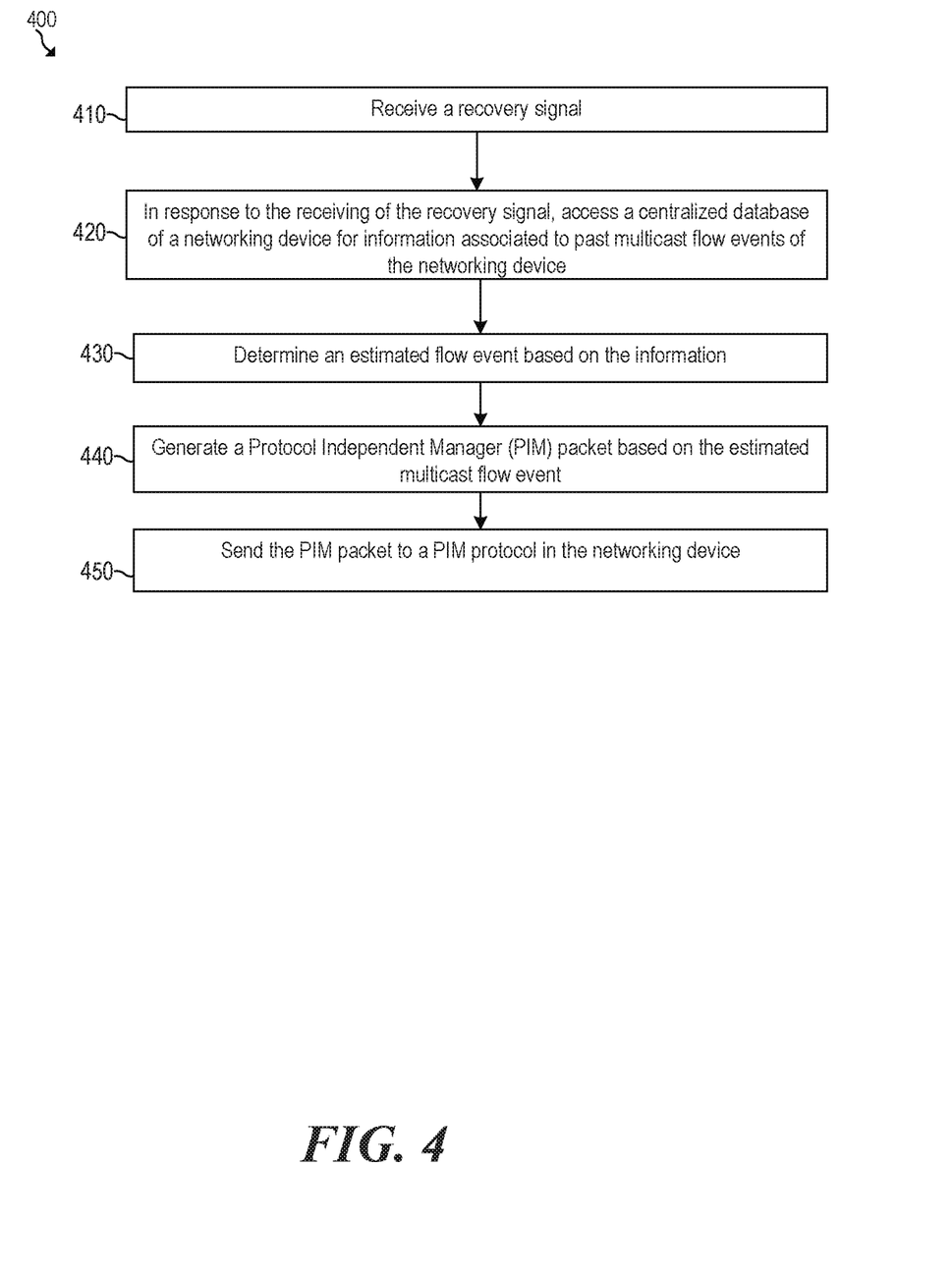
FIG. 4 is a block diagram of a method of sending PIM packets based on estimated multicast flow events, according to some examples.

FIG. 4 illustrates a flowchart for a method 400 to send PIM packets based on an estimated multicast flow event. Although execution of method 400 is described below with reference to networking device 100, other suitable devices for execution of method 400 may be used (e.g., networking device 200 of FIG. 2, switch 300 of FIG. 3, etc.).

At 410, instructions 111 cause processing resource 101 of networking device 100 to receive a recovery signal.

At 420, instructions 112 cause processing resource 101 to access a centralized database of networking device 100 for information associated to past multicast flow events of the networking device. The database may be an OVSDB. Each networking device in the network connected to networking device 100 may have its own OVSDB.

At 430, instructions 113 cause processing resource 101 to determine an estimated flow event based on the information.

At 440, instructions 114 cause processing resource 101 to generate a Protocol Independent Multicast (PIM) packet based on the estimated multicast flow event. As discussed above, the protocol (PIM) used in the packet is similar to the protocol used by a multicast protocol of networking device 100. Accordingly, in a networking device 100 that uses PIM for its multicast protocol, instructions 114 generates a PIM multicast packet.

At 450, instructions 115 cause processing resource 101 to send the PIM packet to the PIM protocol in networking device 100.

Although the flowchart of FIG. 4 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
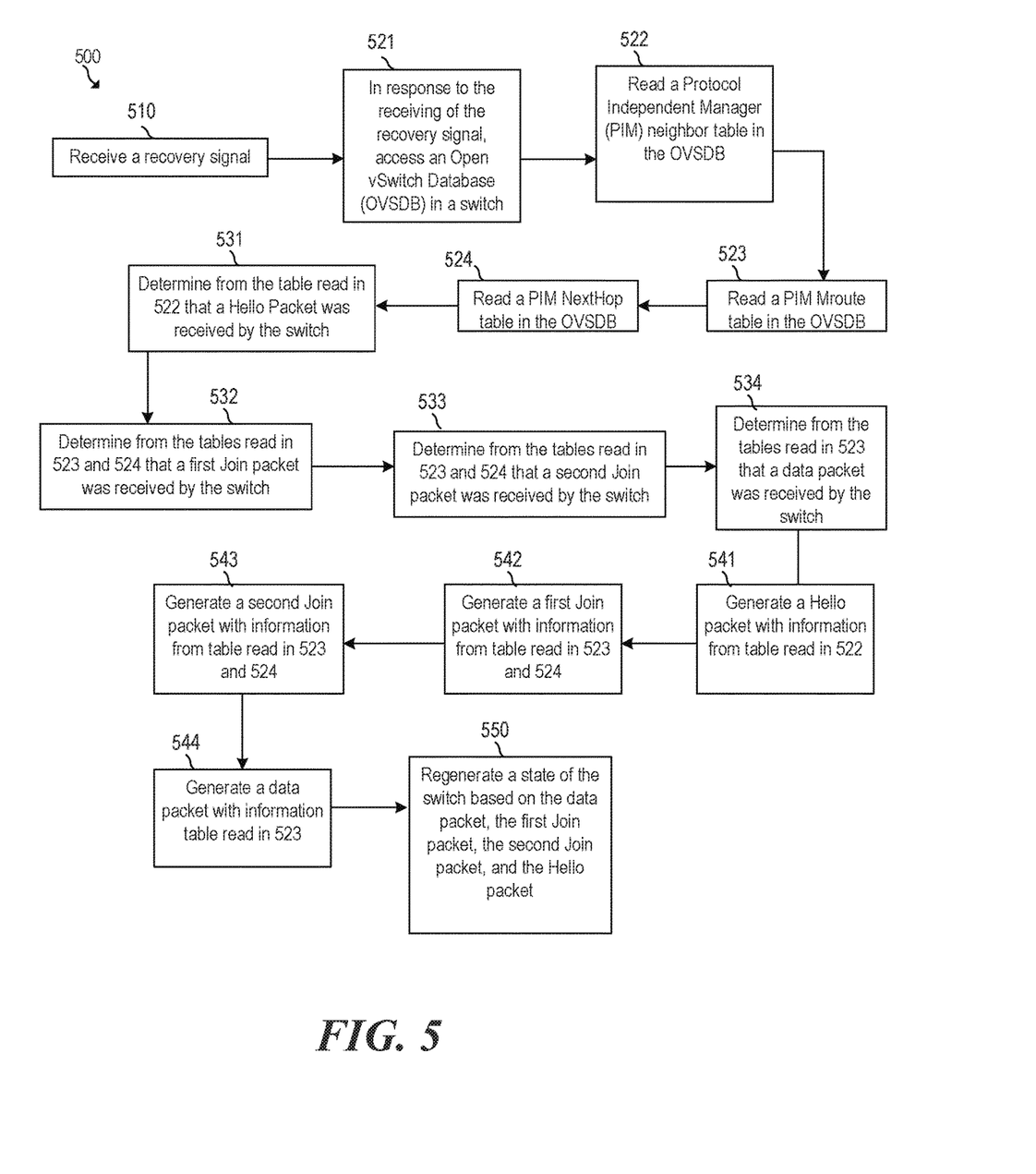
FIG. 5 is a block diagram of a method of sending multiple packets based on data stored in an Open vSwitch Database (OVSDB).

FIG. 5 illustrates a flowchart for a method 500 of sending multiple multicast packets based on information stored in an OVSDB. Although execution of method 500 is described below with reference to networking device 300, other suitable devices for execution of method 400 may be used (e.g., networking device 100 of FIG. 1, networking device 200 of FIG. 2, etc.).

At 510, recovery engine 301 receives a recovery signal. In some examples, the recovery signal may be from first protocol engine 302A due to unplanned failure of second protocol engine 302B and/or planned switchover from second protocol engine 302B to first protocol engine 302A. In some examples, the recovery signal may be from second protocol engine 302B. In some examples, the recovery signal may be from protocol engine 302A after it restarts. In other examples, the recovery signal may be from management plane 310 originating from an administrator.

At 521, recovery engine 301 accesses an OVSDB stored in memory 303. The OVSDB comprises information associated to multicast flow events 303. The flow events occurred prior to switch 300 receiving the recovery signal.

At 522, recovery engine 301 reads a table in the OVSDB that describes neighboring networking devices that uses PIM in the network. The table is part of the information of past flow events 313 stored in the OVSDB of memory 303. In some examples, the table may be called a PIM Neighbor table, as discussed above in Table 1.

At 523, recovery engine 302 reads a table in the OVSDB that describes multicast route IP addresses. The table is part of the information of past flow events 313 stored in the OVSDB of memory 303. In some examples, the table may be called a PIM MRoute table, as discussed above in Table 2.

At 524, recovery engine 302 reads a table in the OVSDB that describes the ports of switch 300 that corresponds to the next hop of specific multicast IP addresses. The table is part of the information of past flow events 313 stored in the OVSDB of memory 303. In some examples, the table may be called a PIM NextHop table, as discussed above in Table 3.

At 531, recovery engine 302 determines from the PIM Neighbor table that a specific Hello Packet (e.g., from a specific source IP address, at a specific port of switch 300, etc.) was received by switch 300. This Hello Packet is characterized as the rebuilt or estimated multicast flow event.

At 532, recovery engine 302 determines from the PIM MRoute table and the PIM NextHop table that a first Join packet was received by switch 300. The Join packet may have a specific multicast group IP address and may designate a specific port on switch 300. For example, in reference to Table 2 and Table 3 described above; recovery engine 302 may determine from the first entry in Table 3 that a rebuilt flow event is a Join packet for port 1/1/3 on switch 3. It may determine this due in part because it is encoded to understand that entries in a specific table are generated after the occurrence of certain events. For example, recovery engine 302 may know that entries in a NextHop table are generated from the receiving of Join packets by switch 300. Thus, when it access the OVSDB and reads entries in a NextHop table, it understands that the flow event that caused the entry is a receiving of a Join packet and determines that a rebuilt flow event is a Join packet. Additionally, recovery engine 302 determines from Table 2 that the multicast group IP address for this rebuilt event is 224.1.1.1 (due to the Pointer to Next Hop field in Table 2).

At 533, recovery engine 302 determines from the PIM MRoute table and the PIM NextHop table that a second Join packet was received by switch 300. The Join packet may have a specific multicast group IP address and may designate a specific port on switch 300. For example, in reference to Table 2 and Table 3 described above, recovery engine 302 may determine from the second entry in Table 3 that a rebuilt flow event is a Join packet for port 1/1/4 on switch 3. Additionally, recovery engine 302 determines from Table 2 that the multicast group IP address for this rebuilt event is 224.1.1.1 (due to the Pointer to Next Hop field in Table 2).

At 534, recovery engine 302 determines that a multicast data packet was received by switch 300. For example, in reference to Table 2, recovery engine 302 determines that the rebuilt multicast flow event is a multicast data packet with source IP 20.20.20.1 and multicast group IP 224.1.1.1.1, received on port 1/1/1 of switch 300.

At 541, recovery engine 302 generates a Hello Packet based on the rebuilt event determined at 532. The Hello Packet may additionally comprise information from the tables (e.g., recovery time, priority, etc.) At 542, recovery engine 302 generates a first Join packet and at 543, recovery engine 302 generates a second Join packet based on the rebuilt events determined at 532 and 533, respectively. The Join packets may include information from the tables (e.g., SL number, etc.) At 544, recovery engine 302 generates a multicast data packet based on the rebuilt event determined at 534. The data packet may comprise information from the table (e.g., NextHop pointer, address family, etc.)

At 550, first protocol engine 302A may regenerate its knowledge of the state of the switch 300 based on the data packet generated at 544, the first Join packet generated at 542, the second Join packet generated at 543, and the Hello Packet generated at 541. For example, first protocol engine 302A may update tables. These tables may be characterized generally as state information 312A.

Although the flowchart of FIG. 5 shows a specific order of performance of certain functionalities, method 500 is not limited to that order. For example, some of the functionalities shown in succession may be performed in a different order, may be executed concurrently or with partial concurrence, or a combination thereof. In some examples, functionalities described herein in relation to FIG. 5 may be provided in combination with functionalities described herein in relation to any of FIGS. 1-4, Method 500 may also comprise additional steps not shown, such as the sending of the packets generated at 541, 542, 543, and 544 to first protocol engine 302.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that when executed by a network device, cause the network device to:
   receive a recovery signal that indicates failure of a first instance of a multicast protocol residing on the network device;
   in response to the receiving of the recovery signal, access data stored in one or more tables storing forwarding information associated with the multicast protocol, wherein the data comprises information associated with past multicast flow events;
   determine a rebuilt multicast flow event based on the data;
   generate locally, by the network device, a multicast protocol packet based on the multicast flow event, wherein the locally generated multicast protocol packet comprises a source address of a node that is different from the network device; and
   send the locally generated multicast protocol packet to a second instance of the multicast protocol residing on the network device, thereby allowing the second instance of the multicast protocol to rebuild state information of components of the network device.

2. The non-transitory machine-readable storage medium of claim 1, wherein the information of past multicast flow events comprises neighbor data of the network device.

3. The non-transitory machine-readable storage medium of claim 1, wherein the information of past multicast flow events comprises multicast route information.

4. The non-transitory machine-readable storage medium of claim 1, wherein the multicast protocol packet comprises a Protocol Independent Multicast (PIM) packet.

5. The non-transitory machine-readable storage medium of claim 1, wherein the information associated with the past multicast flow events is stored in an Open vSwitch database (OVSDB).

6. The non-transitory machine-readable storage medium of claim 1, comprises instructions, that when executed, cause the processing resource to start a timer in response to the recovery signal.

7. A networking device comprising:
   a memory to store information associated with past multicast flow events in the networking device, wherein the information associated with the past multicast flow events is stored in one or more tables storing forwarding information associated with a multicast protocol;
   a first protocol engine; and
   a recovery engine configured to:
     receive a recovery signal that indicates failure of a second protocol engine;
     access the information associated with the past multicast flow events in response to the receiving of the recovery signal;
     determine a rebuilt multicast flow event based on the information associated with the past multicast flow events;
     generate a multicast protocol packet based on the rebuilt multicast flow event, wherein the multicast protocol packet comprises a source address of a node that is different from the networking device; and
     send the multicast protocol packet to the first protocol engine;
   wherein the first protocol engine is to regenerate a state of the networking device based on the multicast protocol packet.

8. The networking device of claim 7, wherein the networking device comprises a data plane and a control plane, and the regeneration of the state of the networking device comprises a regeneration of a state of the control plane.

9. The networking device of claim 7, wherein the recovery engine is to start a timer in response to the recovery signal.

10. The networking device of claim 7, wherein the information associated with the past multicast flow events comprises PIM neighbor data of the network device.

11. The networking device of claim 7, wherein the information associated with the past multicast flow events comprises PIM multicast route information.

12. The networking device of claim 7, wherein the multicast protocol packet comprises a PIM packet.

13. The networking device of claim 7, wherein the information associated with the past multicast flow events is stored in an Open vSwitch database (OVSDB).

14. The networking device of claim 13, wherein the regeneration of the state of the networking device does not alter the OVSDB.

15. The networking device of claim 7,
   wherein the networking device comprises a data plane comprising an Application Specific Integrated Circuit (ASIC); and
   wherein regeneration of the state of the networking device does not alter the ASIC.

16. A method comprising:
   receiving a recovery signal that indicates failure of a first instance of a PIM protocol residing on a network device;

in response to the receiving of the recovery signal, accessing information associated with past multicast flow events of the networking device, wherein the information associated with the past multicast flow events is stored in one or more tables storing forwarding information associated with the PIMt protocol;

determine a rebuilt multicast flow event based on the information associated with the past multicast flow events;

generating a PIM packet based on the rebuilt multicast flow event, wherein the PIM packet comprises a source address of a node that is different from the networking device; and sending the PIM packet to a second instance of the PIM protocol residing on the networking device, thereby allowing the second instance of the PIM protocol to rebuild state information of components of the networking device.

17. The method of claim 16, comprising:

regenerating, by the PIM protocol, a state of the networking device based on the PIM packet.

18. The method of claim 16, wherein the information associated with the past multicast flow events comprises PIM neighbor data of the networking device.

19. The method of claim 16, wherein the information associated with past multicast flow events is stored in an OVSDB.

\* \* \* \* \*